United States Patent [19]
Marti Sala

[11] Patent Number: 6,033,156
[45] Date of Patent: Mar. 7, 2000

[54] DEVICE FOR CONVEYING EMPTY BOTTLES IN A HANGING ARRANGEMENT

[76] Inventor: Jaime Marti Sala, Emancipacion, 8 08017, Barcelona, Spain

[21] Appl. No.: 08/801,590

[22] Filed: Feb. 18, 1997

[30] Foreign Application Priority Data

Feb. 15, 1996 [ES] Spain ..................................... 9600367

[51] Int. Cl.[7] .................................................. B65G 53/16
[52] U.S. Cl. .............................................. 406/86; 406/88
[58] Field of Search ................................. 406/86, 87, 88, 406/191, 194

[56] References Cited

U.S. PATENT DOCUMENTS

| | | | |
|---|---|---|---|
| 5,437,521 | 8/1995 | Ouellette | 406/88 |
| 5,484,237 | 1/1996 | Langenbeck | 406/88 X |
| 5,516,239 | 5/1996 | Warren et al. | 406/88 |
| 5,628,588 | 5/1997 | Ouellette | 406/88 |
| 5,630,679 | 5/1997 | Simkowski et al. | 406/88 X |
| 5,695,302 | 12/1997 | Hilbish | 406/88 |

*Primary Examiner*—D. Glenn Dayoan
*Attorney, Agent, or Firm*—Jacobson, Price, Holman & Stern, PLLC

[57] ABSTRACT

A device for conveying empty bottles in a hanging arrangement applicable to the conveyance of bottles made of plastics material, the bottles including a flange in the region of their neck, the flange being partially introduced and guided in lateral channels whose open sides face each other, the flange resting on the lower edge of the respective channel and being in a position to slide along the channels, outlets for insufflating pressurized air from lateral ducts having been provided inside the channels. Above the path traced by the necks of the bottles extends a duct which opens onto the path at a slot and is connected to a suction device that generates a negative pressure.

4 Claims, 1 Drawing Sheet

DEVICE FOR CONVEYING EMPTY BOTTLES IN A HANGING ARRANGEMENT

FIELD OF THE INVENTION

The present invention concerns a device for conveying empty bottles in a hanging arrangement, the device being in particular appropriate for conveying lightweight bottles made of plastics material and of the type comprising a collar-flange in the region of their neck, the flange being provided to hangingly rest on guide tracks, and of the type comprising pressurized air supply means arranged at both sides of the bottle traveling path and conveniently oriented to apply a thrust to the bottles thereby conveying them in a push-on direction along the guide tracks.

BACKGROUND OF THE INVENTION

European Patent Application 344417 describes an apparatus for the conveyance of plastic bottles of the aforementioned characteristics, the apparatus being characterized in that the pressurized air insufflation nozzles, inclined in the bottle push-on direction, are arranged in an area basically affecting the upper portion directly next to the bottle neck.

On the other hand, European Patent Application 423261 describes a conveyor device of the aforementioned type where pressurized air insufflation nozzles have been provided which act by supplying air jets oriented above and below the track supporting the flange or collar of the neck.

In the above-mentioned publications of prior art, as well as in the known devices of the prior art, the flange or collar of the neck of the bottle or container rests on tracks arranged at both sides of the conveyance path, and the air insufflating means act obliquely from both sides on the bottle body or even above the flange (EP 423261). Such an arrangement entails that the bottle can tilt out of its vertical center line and in particular swing with respect to the hanging area thereby risking jams and disturbing the smooth pushing-on and also being likely to cause damage to the outer surface or wall of the bottle (caused by blows against the guide tracks) thereby ruining the latter's integrity.

SUMMARY OF THE INVENTION

The device as per the invention seeks to obviate the above-mentioned drawbacks, and to such an effect it has been foreseen that the aforementioned collar-flange of the bottle or container to be conveyed rests at both sides on a lower track to which a corresponding parallel profile is superimposed which limits the tilting motion of the flange and thereby the possible swinging of the bottle with respect to the hanging area, the track and profile together delimiting respective lateral channels whose open sides are facing each other and whose cross-section has for example the shape of a lying "U", the open sides receiving and longitudinally guiding the collar-flanges of the bottles during their conveyance.

Also, characteristic of the device as per the invention is the fact that inside the above-mentioned channels which are facing each other and are provided to support and longitudinally guide the bottles in hanging arrangement, outlets have been provided through which it has been foreseen to insufflate pressurized air, the outlets adopting an adequate inclination such that the pressurized fluid circulating through them applies a push-on thrust to the bottles in such a way that the flanges of their necks slide along the aforementioned channels thereby being guided by them.

Another salient aspect of the invention consists in the fact that above the bottle neck guide path, a duct has been provided which opens onto the path, for example, at a slot centered on the path, the duct being connected to a suction device generating a negative pressure (of adjustable magnitude) which tends to lift the bottles. Such a combination of elements and their respective arrangement result in the bottles sliding with a minimum friction along the lateral channels provided to guide their collar-flange, this latter being driven on an air cushion created by the impulsion of the pressurized fluid through the inside of the channels, and by the additional effect of an upward lift of the bottles caused by the suction force exerted from the upper duct in such a way that the bottle practically floats as it slides on the lateral channels. The upper suction can also extract dust and other particles from the inside of the bottles thereby contributing to keep them clean.

The above and other objects, advantages and features of the present invention will become more apparent from the following description of certain preferred embodiments thereof.

BRIEF DESCRIPTION OF THE DRAWING

The invention will now be described in detail with reference to the accompanying drawings wherein:

The FIGURE is a vertical cross-section of the bottle conveyance path as has been explained above showing the basic elements of the invention and their operational interaction (fluid circulation arrows).

DETAILED DESCRIPTION OF THE PREFERRED EMBODIMENT

Figure 1:
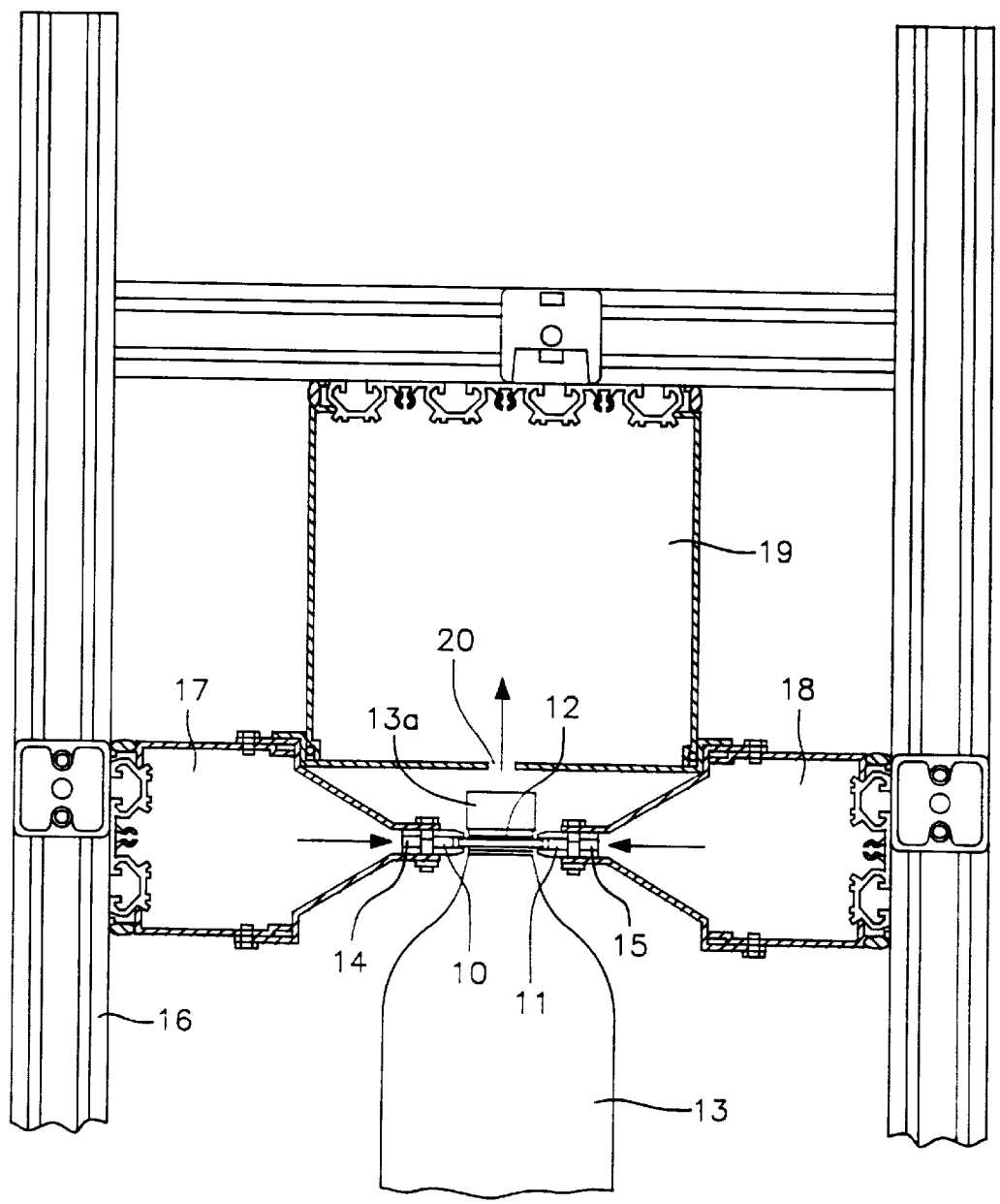

According to the invention the known guide tracks of the prior art have been formed by two lateral channels (10), (11) whose cross-section is shaped like a lying "U" and whose open sides are directly facing each other and receive distal portions of the collar-flange (12) of the bottles (13) to be conveyed, the flanges (12) being thus guided inside the channels (10, 11), resting on the lower edge of the respective channel and being in a position to longitudinally slide by effect of the pressurized air insufflation from the inside of the channels (10,11) which have been provided with pressurized air supply outlets (14), (15). To such an effect it can be seen that on each of the side members of the frame (16) supporting the conveyor, a corresponding duct (17), (18) has been provided through which pressurized air is impelled and passes through the aforementioned outlets (14, 15) formed by inclined nozzles oriented to favor the longitudinal traveling of the bottles (13) in a given push-on direction and in such a way that their flanges (12) slide along the lateral channels (10, 11).

As has been explained, above the guided path traced by the bottle necks (13a) another duct (19) has been arranged which is open at a longitudinal slot (20) centered on the path, the duct (19) being connected to a suction device (not shown and having a structure known per se) generating a negative pressure.

It is understood that the device as per the invention will include some means known per se and provided to adjust to convenient values both the pressure of the air blown through the outlets (14, 15) and the strength of the negative pressure generated in duct (19), in order to adapt the values to the characteristics of the bottles to be handled.

The device of the invention can also be applied with the addition of a pressurized air insufflation onto the sides of the bottles (13) from both sides of the conveyor line, in order to push on the bottle in a hanging arrangement as per a conventional technique if this were deemed necessary.

I claim:

1. A device for conveying, in a hanging arrangement, empty lightweight bottles made of plastics material of the type including a body having a collar/flange in a region of their neck, said device comprising:

guide tracks for encompassing the flange of the bottles, and means for the supply of pressurized air at both sides of the bottle body through said guide tracks, said means being oriented to apply a thrust to the bottle body to convey the bottle body in a push-on direction along said tracks, said guide tracks being formed by two lateral channels having open sides facing each other and into which the flanges of the bottles are partially introduced and resting on a lower edge of the respective channel and slidable along said channels.

2. A device as claimed in claim 1, wherein pressurized air insufflation outlets are provided inside said lateral channels.

3. A device as claimed in claim 1, wherein a duct is located above a path followed by the bottle necks, said duct opens onto said path and is connected to a suction device generating a negative pressure on the bottle necks.

4. A device as claimed in claim 2, wherein said pressurized air insufflating outlets comprise inclined nozzles oriented to favor longitudinal traveling of the bottle in a given direction along said lateral channels.

* * * * *